United States Patent [19]

Möckli

[11] Patent Number: 5,708,151
[45] Date of Patent: Jan. 13, 1998

[54] CATIONIC IMIDAZOLE AZO DYES

[75] Inventor: Peter Möckli, Schönenbuch, Switzerland

[73] Assignee: Ciba Specialty Chemicals Corporation, Tarrytown, N.Y.

[21] Appl. No.: 552,153

[22] Filed: Nov. 2, 1995

[30] Foreign Application Priority Data

Nov. 3, 1994 [CH] Switzerland ............ 3286/94

[51] Int. Cl.⁶ .............. D06P 7/00; D06P 3/70; C09B 44/16
[52] U.S. Cl. .............. 534/608; 534/573; 534/589; 534/612
[58] Field of Search .............. 534/608, 612, 534/573, 589

[56] References Cited

U.S. PATENT DOCUMENTS

| | | | |
|---|---|---|---|
| 3,133,910 | 5/1964 | Baumann et al. | 534/608 |
| 3,173,907 | 3/1965 | Klingsberg et al. | 534/608 X |
| 3,271,383 | 9/1966 | Yamaya et al. | 534/608 |
| 3,410,840 | 11/1968 | Baumann et al. | 534/608 |
| 4,393,005 | 7/1983 | Patsch et al. | 260/245.73 |
| 4,557,732 | 12/1985 | Hahnke et al. | 534/608 X |
| 4,845,209 | 7/1989 | Adam | 540/132 |

FOREIGN PATENT DOCUMENTS

| | | | |
|---|---|---|---|
| 0233141 | 4/1964 | Australia | 534/608 |
| 0699778 | 12/1964 | Canada | 534/608 |
| 1051617 | 12/1966 | United Kingdom | 534/608 |
| 1098445 | 1/1968 | United Kingdom | 534/608 |

*Primary Examiner*—Floyd D. Higel
*Attorney, Agent, or Firm*—Kevin T. Mansfield

[57] ABSTRACT

The cationic imidazole azo dyes of the formulae

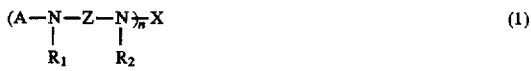 (1)

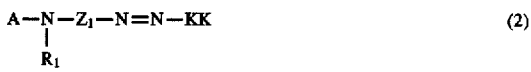

(2)

and

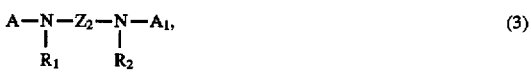 (3)

in which A and $A_1$ independently of one another are each a radical of the formula

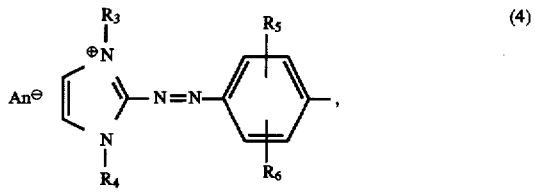 (4)

Z is the radical of an aliphatic or aromatic diamine, $R_1$ and $R_2$ are each hydrogen or substituted or unsubstituted $C_1$–$C_4$alkyl or, together with the two nitrogen atoms to which they are attached and with Z, form a 5-, 6- or 7-membered ring, X is the radical of a bridging member, n is 2, 3 or 4, $Z_1$ is the radical of an aromatic diamine, $Z_2$ is the radical of an aliphatic diamine, KK is the radical of a coupling component, $R_3$ and $R_4$ are each hydrogen or substituted or unsubstituted $C_1$–$C_4$alkyl, $R_5$ and $R_6$ independently of one another are each hydrogen or substituted or unsubstituted $C_1$–$C_4$alkyl or $C_1$–$C_4$alkoxy and $An^{\ominus}$ is a colorless anion, are particularly suitable for the dyeing of paper in red or violet shades having good fastness properties.

31 Claims, No Drawings

CATIONIC IMIDAZOLE AZO DYES

The present invention relates to novel cationic imidazole azo dyes, to processes for their preparation, to their use for dyeing textile materials and, in particular, paper, and to intermediates suitable for the synthesis of these dyes.

The novel imidazole azo dyes are of the formula

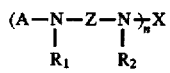  (1)

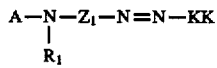  (2)

or

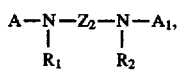  (3)

in which A and $A_1$ independently of one another are each a radical of the formula

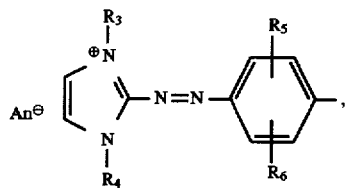  (4)

Z is the radical of an aliphatic or aromatic diamine, $R_1$ and $R_2$ independently of one another are each hydrogen or substituted or unsubstituted $C_1$–$C_4$alkyl or, together with the two nitrogen atoms to which they are attached and with Z, form a 5-, 6- or 7-membered ring, X is the radical of a bridging member, n is 2, 3 or 4, $Z_1$ is the radical of an aromatic diamine, $Z_2$ is the radical of an aliphatic diamine, KK is the radical of a coupling component, $R_3$ and $R_4$ independently of one another are each hydrogen or substituted or unsubstituted $C_1$–$C_4$alkyl, $R_5$ and $R_6$ independently of one another are each hydrogen or substituted or unsubstituted $C_1$–$C_4$alkyl or $C_1$–$C_4$alkoxy and $An^\ominus$ is a colourless anion.

The term alkyl radicals according to the invention refers in general to open-chain, branched or cyclic alkyl groups. Cycloalkyl preferably has 5 to 8 carbon atoms, while open-chain alkyl preferably has 1 to 8 carbon atoms, in particular 1 to 4 carbon atoms.

Suitable examples of unbranched or branched, open-chain alkyl are methyl, ethyl, n-propyl, isopropyl, n-butyl, sec-butyl, tert-butyl, n-pentyl, isopentyl, n-hexyl, isohexyl and 2-ethylhexyl.

These alkyl radicals can be substituted one or more times by, for example, hydroxyl, carboxyl, halogen, cyano or $C_1$–$C_4$alkoxy, or by $C_1$–$C_4$alkoxy which is substituted by hydroxyl, or by amino, alkylamino, dialkylamino, aminocarbonyl, phenyl, phenoxy or phenylaminocarbonyl, in which case the phenyl group in the three latter radicals can be substituted, for example, by $C_1$–$C_4$alkyl, $C_1$–$C_4$alkoxy or phenoxy.

Suitable radicals of this kind are for example hydroxyethyl, 2-hydroxy-1-propyl, 1-hydroxyisopropyl, 2-hydroxyisopropyl, 2,3-dihydroxy-1-propyl, methoxyethyl, ethoxymethyl, methoxycarbonyloxyethyl, chloroethyl, cyanoethyl, benzyl, 1-phenylethyl, 2-phenylethyl, dimethylaminoethyl, diethylaminoethyl, hydroxyethylaminoethyl, dihydroxyethylaminoethyl, methoxycarbonylethyl or aminocarbonylethyl.

Cycloalkyl is in particular cyclopentyl, or cyclohexyl; a suitable substituent is in particular $C_1$–$C_4$alkyl, especially $CH_3$.

Suitable alkoxy radicals are preferably those having 1 to 4 carbon atoms, for example methoxy, ethoxy, propoxy, isopropoxy, n-butoxy, isobutoxy or tert-butoxy. These alkoxy radicals can be substituted, for example by the radicals listed as substituents of the alkyl groups, in particular by hydroxyl or $C_1$–$C_4$alkoxy. Suitable substituted alkoxy radicals are for example hydroxyethoxy, methoxyethoxy, 2-hydroxypropoxy, 1,2-dihydroxy-3-propoxy or 1,2-dimethoxy-3-propoxy.

Halogen refers to fluorine, bromine, iodine or, in particular, chlorine.

Suitable radicals of an aliphatic diamine for Z and $Z_2$ are for example alkylenediamines, whose alkylene groups can be straight-chain, branched or cyclic. The alkylene groups can in addition be substituted, for example by halogen, alkoxy or hydroxyl, or the alkylene chains can be interrupted by heteroatoms, for example —O— or —$NR_1$—.

Suitable alkylene radicals, for example, are ethylene, 1,3-propylene, 1,2-propylene, 1,2-butylene, 1,4-butylene, 1,6-hexylene, 1,8-octylene, 1,12-dodecylene, 1,16-hexadecylene, 1,4-cyclohexylene, 2-hydroxy-1,3-propylene, 2-chloro-1,3-propylene or 3-oxa-1,5-pentylene.

Z and $Z_2$ can also, in each case together with the two adjacent nitrogen atoms and $R_1$ and $R_2$, form a substituted or unsubstituted 5-, 6-, or 7-membered ring which can contain further heteroatoms. The piperazine ring is particularly suitable.

Examples of Z and $Z_1$ as radicals of an aromatic diamine are 1,4-phenylene and 1,4-naphthylene. The aromatic radicals can be substituted, for example by alkyl, alkoxy or halogen.

Z as the radical of an aliphatic diamine is in particular an unsubstituted $C_2$–$C_6$alkylene, especially a $C_3$–$C_6$alkylene, or Z or $Z_2$ forms, in each case together with the two adjacent nitrogen atoms and $R_1$ and $R_2$, a piperazine ring.

$Z_2$ as the radical of an aliphatic diamine is in particular an unsubstituted $C_8$–$C_{16}$alkylene, especially a $C_{10}$–$C_{14}$alkylene.

Where $R_1$ and $R_2$ are not part of a 5-, 6- or 7-membered ring they are in particular methyl or hydrogen.

Z and $Z_1$ as the radical of an aromatic diamine is in particular an unsubstituted phenylene or naphthylene radical, especially a 1,4-phenylene radical.

X as a radical of a bridging member is derived from compounds which are capable of reacting with two or more amino groups. Suitable examples are phosgene, polycarboxylic acid halides, polycarboxylic esters, alkyl polyhalides and polyhalogenated aromatic or heteroaromatic compounds, especially dihalogenated xylenes or halogenated triazines and pyrimidines in which a halogen atom is substituted by reaction with a compound containing a hydroxyl or amino group. Other suitable bridging members are compounds in which two or more of the abovementioned groups are connected to one another, for example two halogenated triazine groups linked via an aromatic or aliphatic diamine.

Particularly suitable bridging members are derived from phosgene, succinyl dichloride, oxalyl dichloride, terephthaloyl dichloride, ethylene dibromide, xylene dichloride or dihalotriazines of the formula

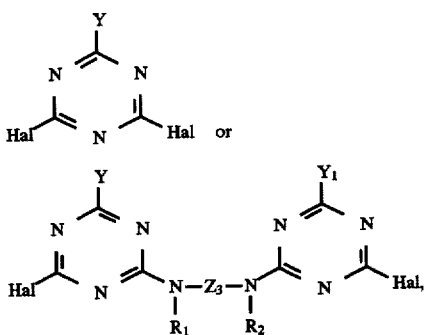

in which

Hal is halogen,

Y and $Y_1$ independently of one another are each a radical A of the above formula (4), or are halogen, hydroxyl, amino, monoalkylamino, dialkylamino or anilino, which can be substituted by $C_1$–$C_4$alkyl, $C_1$–$C_4$alkoxy or amino, or are the radical of a cyclic amine, $Z_3$ is the radical of an aliphatic or aromatic diamine, and $R_1$ and $R_2$ independently of one another are each hydrogen or substituted or unsubstituted $C_1$–$C_4$alkyl.

Particularly suitable bridging members are derived from compounds of the formula (5) or (6) in which Y and $Y_1$ independently of one another are each a radical A of the above formula (4) or have one of the following meanings: chlorine, hydroxyl, amino, mono-$C_1$–$C_8$alkylamino, di-$C_1$–$C_8$alkylamino, 1-piperidino, morpholino or 1-piperazino, where the 1-piperazino radical can be substituted by alkyl at the nitrogen atom not attached to the triazine ring. The alkyl groups can furthermore be substituted by hydroxyl, amino, mono-$C_1$–$C_4$alkylamino or di-$C_1$–$C_4$alkylamino.

In the bridging members of the formulae (5) and (6) Hal is chlorine in particular.

In the bridging members of the formula (6), $Z_3$ is as defined above for Z. $Z_3$ is in particular a $C_2$–$C_8$alkylene, 1,3-phenylene or 1,4-phenylene radical or, together with the two adjacent nitrogen atoms and $R_1$ and $R_2$, forms a piperazine ring.

In the dyes of the formulae (1), (2) and (3), A and $A_1$ are each preferably radicals of the formula (4) in which $R_3$ and $R_4$ are each $C_1$–$C_4$alkyl, especially methyl or ethyl. $R_5$ and $R_6$ are preferably methoxy, methyl or in particular hydrogen.

Suitable coupling components KK are those which are customary with azo dyes and are known from the relevant literature.

Examples from the large number of possible components KK are coupling components of the benzene series, of the naphthalene series, of the open-chain methylene-active compounds (for example the acylacetarylamides) and of the heterocyclic series.

Examples of the said radicals of coupling components KK are radicals from the series of the acylacetarylamides, phenols, naphthols, pyridones, quinolones, pyrazoles, indoles, diphenylamines, anilines, aminopyridines, pyrimidines, pyrimidones, naphthylamines, aminothiazoles, thiophenes or hydroxypyridines.

Radicals KK which merit particular mention are those from the series of the acetoacetanilides, phenols, anilines, diphenylamines, naphthylamines, indoles, quinolines, pyridones, pyrazoles, quinolones and aminopyridines.

These coupling components can carry further substituents which are customary for coupling components in the chemistry of dyes, examples being hydroxyl, amine, alkylamino, dialkylamino, halogen, alkoxy, aryl, aryloxy, alkylcarbonylamino, arylcarbonylamino, alkylsulfonylamino or sulfo.

Owing to their particularly good dyeing properties for the dyeing of paper, dyes of the formula (2) are particularly preferred in which KK is the radical of a naphtholsulfonic acid, an acetoacetanilide or of triamino- or trihydroxypyrimidine.

Suitable anions $An^\ominus$ include both inorganic and organic anions, for example halide, such as chloride, bromide or iodide, sulfate, hydrogen sulfate, methyl sulfate, boron tetrafluoride, aminosulfonate, perchlorate, carbonate, bicarbonate, phosphate, phosphomolybdate, phosphotungstate, phosphotungstomolybdate, benzenesulfonate, naphthalenesulfonate, 4-chlorobenzenesulfonate, oxalate, maleate, acetate, propionate, tactate, succinate, chloroacetate, tartrate, methanesulfonate or benzoate ions, or complex anions, such as that of chlorine zinc double salts.

The anion is generally predetermined by the preparation process. Anions present are preferably the chlorides, hydrogen sulfates, sulfates, methosulfates, phosphates, formates, lactates or acetates. The anions can be exchanged for other anions by a known method.

Very particularly preferred dyes are of the formula

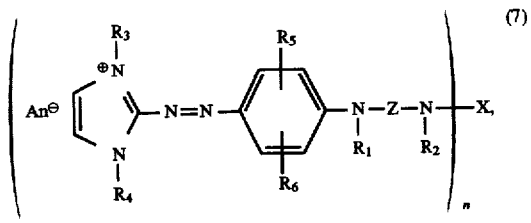

in which

Z is a phenylene or naphthylene radical, in particular a 1,4-phenylene radical, or an unsubstituted $C_2$–$C_8$alkylene radical, in particular a $C_3$–$C_6$alkylene radical, or in which Z, together with the two adjacent nitrogen atoms and $R_1$ and $R_2$, forms a piperazine ring, $R_1$ and $R_2$ independently of one another are each methyl or hydrogen, $R_3$ and $R_4$ independently of one another are each methyl or ethyl, $R_5$ and $R_6$ independently of one another are each methoxy, methyl or hydrogen, n is 2, 3 or 4, $An^\ominus$ is a colourless anion and X is the radical of a bridging member selected from the group consisting of phosgene, succinyl dichloride, oxalyl dichloride, terephthaloyl dichloride, ethylene dibromide, xylene dichloride and dihalotriazines of the formula

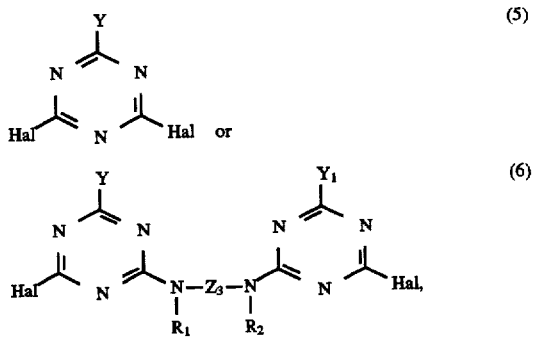

in which

Hal is chlorine,

Y and $Y_1$ independently of one another are each a radical A of the formula

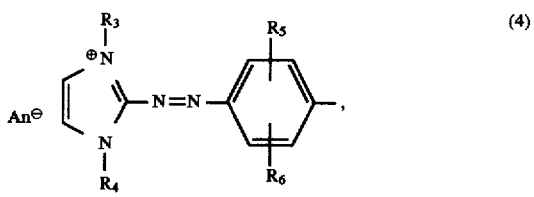

or are chlorine, hydroxyl, amino, mono-$C_1$-$C_8$alkylamino, di-$C_1$-$C_8$alkylamino, 1-piperidino, morpholino or 1-piperazino, in which case the 1-piperazino radical can be substituted by alkyl at the nitrogen atom not attached to the triazine ring, and in which the alkyl groups can be substituted by hydroxyl, amino, mono-$C_1$-$C_4$alkylamino or di-$C_1$-$C_4$alkylamino, and $Z_3$ is a $C_2$-$C_8$alkylene, 1,3-phenylene or 1,4-phenylene radical or, together with the two adjacent nitrogen atoms and $R_1$ and $R_2$ forms a piperazine ring.

The dyes of the formula (1) are obtained, for example, by reacting a compound of the formula

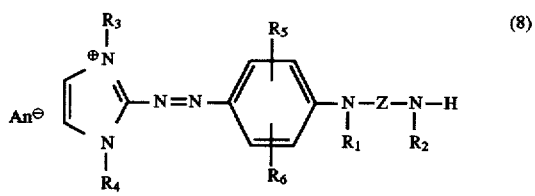

with a bridging member of the formula Hal-X-Hal, in which $R_1$, $R_2$, $R_3$, $R_4$, $R_5$, $R_6$, Z and $An^\ominus$ are as defined under formulae (1) and (4), and Hal fluorine, bromine, iodine or chlorine.

The compounds of the formula (8) are novel, and the present invention also relates to them. They are obtained, for example, by reacting a compound of the formula

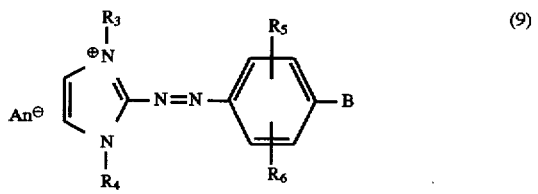

with a diamine of the formula

in which

B is alkoxy or halogen, and $R_1$, $R_2$, $R_3$, $R_4$, $R_5$, $R_6$, Z and $An^\ominus$ are as defined under formulae (1) and (4).

B is in particular $C_1$-$C_4$alkoxy, especially methoxy, or chlorine.

The compounds of the formulae (9) and (10) are known or can be prepared in a manner known per se. The compounds of the formula (9), for example, are obtained by diazotizing 4-alkoxyanilines, coupling the product with an imidazole and then carrying out alkylation and quaternization.

The reaction of the compounds of the formula (8) with a bridging member of the formula Hal-X-Hal is carried out under conditions which are known per se for reactions of amines with halogen compounds. These conditions depend primarily on the nature of the bridging member. The reaction is carried out, for example, in water or an inert solvent at a temperature between 0° and 150° C., if desired under elevated pressure and/or with the addition of alkali.

Using 2,4,6-trichloro-1,3,5-triazine as bridging member, the reaction conditions depend on whether only 2 or all three chlorine atoms are to be reacted. In the former case, the reaction is carried out at a temperature between 25° and 50° C. and at a pH of 6, for example, after which the third chlorine atom can be reacted with a further diamine, which is preferably of a different type. This reaction takes place, for example, at from about 80° to 100° C., preferably from about 85° to 95° C., and at a pH of from about 7 to 9. If on the other hand it is desired to replace all three chlorine atoms by the same diamine, the reaction can be carried out, for example, at a pH of from about 7 to 9 and the reaction mixture immediately heated to about 80° to 100° C.

The reaction of a compound of the formula (9) with a diamine of the formula (10) to give a compound of the formula (8) is carried out, for example, at a temperature of between about 40° and 140° C., preferably between 50° and 120° C., if desired under pressure and/or in an inert gas atmosphere, and in an inert solvent, for example in water or aliphatic alcohols, examples being $C_1$-$C_8$ alcohols such as methanol, ethanol or, in particular, isopropanol, but especially in aprotic polar solvents such as dimethylformamide or dimethyl sulfoxide. With diamines which are liquid under the reaction conditions, it is possible, if desired, to dispense with a solvent.

If Z in the compound of the formula (10) employed is an aromatic amine, then the products of the reaction are almost exclusively of the formula (8), i.e. products of one molecule of the compound of the formula (9) with one molecule of the compound of the formula (10). If, on the other hand, Z is the radical of an aliphatic amine, then reaction products of the above formula (3) are also formed, i.e. reaction products of two molecules of the compound of the formula (9) with one molecule of the compound of the formula (10).

By suitable selection of the reaction conditions it is possible to control the reaction in such a way that the particular desired reaction product of the formula (8) or of the formula (3) is formed predominantly or even almost exclusively. The corresponding operating techniques are known in principle.

The compounds of the formula (8) are useful intermediates for the preparation of dyes of the formula (1). In addition, they are suitable even on their own for dyeing materials which are commonly dyed with cationic dyes, for example polyacrylonitrile, mechanical wood pulp and hair, especially living human hair. Dyeings in red or violet shades with good fastness properties are obtained.

Those compounds of the formula (8) in which $R_2$ is hydrogen can in addition be diazotized and coupled with a coupling component KK as defined above, in which case a dye of the formula (2) is obtained.

The diazotization of the compounds of the formula (8) in which $R_2$ is hydrogen is carried out in a manner known per se, for example using sodium nitrite in an aqueous medium which has been made acidic, for example with hydrochloric acid or sulfuric acid. The diazotization can also, however, be carried out using other diazotizing agents, for example nitrosylsulfuric acid. During the diazotization, an additional acid can be present in the reaction medium, for example phosphoric acid, sulfuric acid, acetic acid, propionic acid, hydrochloric acid or mixtures of these acids, for example mixtures of phosphoric acid and acetic acid. The diazotization is advantageously carried out at temperatures of from −10° to 30° C., for example from −10° C. to room temperature.

The coupling of the diazotized compound of the formula (8) in which R₂ is hydrogen with a coupling component KK is likewise carried out in a known manner, for example in a weakly acidic to weakly alkaline, aqueous or aqueous-organic medium, advantageously at temperatures of from -10° to 30° C., in particular below 10° C. Diazotization and coupling can be carried out, for example, by a one-pot method, in other words in the same reaction medium.

The dyes of the formulae (1), (2) and (3) according to the invention are suitable for dyeing polyacrylonitrile materials and leather, but especially for dyeing paper, since they possess a high substantivity for this substrate. The dyes in which Z or Z₂ is the radical of an aliphatic amine give dyeings in red shades, while the dyes in which Z or Z₁ is the radical of an aromatic amine give dyeings in violet shades. The resulting dyeings have good fastness properties. The effluents are in most cases completely colourless.

The dyes of the formulae (1), (2) and (3) can be employed both in mixtures with one another and in mixtures with other cationic dyes. Particularly preferred dye mixtures are those in which a violet dye of the formula (1) is present together with a cationic copper phthalocyanine dye. The present invention additionally relates to these dye mixtures. Using such mixtures on paper, dyeings in highly attractive neutral blue shades are obtained. Suitable copper phthalocyanine dyes are those dyes which are known from the literature and can be used for the dyeing of paper, especially the dyes described in U.S. Pat. No. 4,845,209, U.S. Pat. No. 4,393,005 and EP-A-0 174 586.

U.S. Pat. No. 4,845,209 discloses copper phthalocyanine dyes of the formula

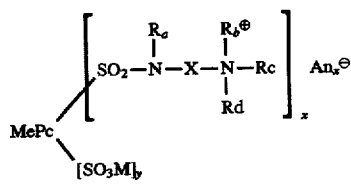

wherein

MePc is a copper, cobalt or nickel phthalocyanine radical,

Rₐ is hydrogen or alkyl,

X is alkylene, and

R_b, R_c and R_d, are each independently alkyl which is unsubstituted or substituted by hydroxy, alkoxy, phenyl or amino, or Rₐ and R_b, when taken together are methylene, ethylene or propylene if X is methylene or ethylene, or two or three of R_b, R_c and R_d, together with the nitrogen atom, form a 5- to 7-membered unsubstituted or substituted heterocyclic ring which may contain one or two additional hetero atoms selected from the group consisting of O, N and S as ring members, An⁻ is an anion and M is a cation, and x is greater than y and y is greater than 0, and the sum of x+y is 4 or less than 4.

U.S. Pat. No. 4,393,005 discloses copper phthalocyanine dyes of the formula

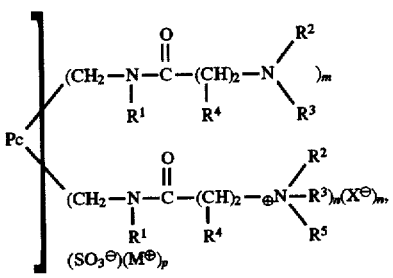

where Pc is an (m+n+p)-valent phthalocyanine radical, R¹ is H or alkyl, R² and R³ independently of one another are alkyl, hydroxyalkyl, cycloalkyl, benzyl, phenyl or tolyl, or

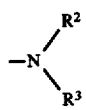

is pyrrolidinyl, imidazolyl, 2-ethyl-4-methylimidazolyl, morpholinyl, piperazinyl or N'-alkylpiperazinyl, or is

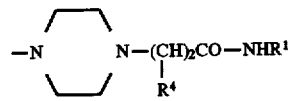

R⁴ is H or methyl, R⁵ is alkyl, hydroxyalkyl or benzyl, X⁻ is one equivalent of an anion, M⁺ is one equivalent of a cation, z is 1 or 2, p is 0 or 1, m is 0 to 1 and n is from 1 to 4, and 1≦(m+n)≦4.

The dyes of the formulae (1), (2) and (3) can be formulated as a solid or liquid commercial form and employed for the dyeing of paper.

As a powder or granules, the dyes are used in particular in discontinuous mass dyeing, in which the dye is added in batches to the pulper, hollander or the mixing vat. In this case the dyes are preferably used in the form of dye preparations which can comprise diluents, for example urea as solubilizer, dextrins, Glauber's salt, sodium chloride and also dispersants, dusting agents and sequesterants, such as tetrasodium pyrophosphate.

The invention consequently also relates to solid dye preparations for the dyeing of paper which comprise dyes of the formula (1), (2) or (3).

In recent years, the use of concentrated aqueous solutions of dyes has gained in importance, specifically because of the advantages which such solutions have over ayes in powder form. By using solutions, the difficulties associated with the formation of dust are avoided and the user is freed from the time-consuming and often difficult dissolution of the dye powder in water. The use of concentrated solutions has been prompted furthermore by the development of continuous dyeing processes for paper, since in these processes it is advantageous to add the solution directly to the hollander or at any other suitable point in papermaking.

The invention therefore additionally relates to concentrated aqueous solutions of dyes of the formula (1), (2) or (3) which contain at least 5 per cent by weight, for example from 8 to 30 per cent by weight, of dye, based on the total weight of the solution.

Concentrated aqueous solutions of dyes of the formula (1), (2) or (3) can be prepared, for example, by filtering the dye suspension obtained in the preparation of the dye, subjecting the filtrate, if desired, to desalination, for example by a membrane separation technique, and then stabilizing it with an acid, for example formic acid, acetic acid or lactic acid, and by the addition of auxiliaries such as urea, ε-caprolactam or polyethylene glycol.

The dye solutions prepared in this way preferably contain from 400 to 900 parts of water, from 0 to 400 parts of an organic carboxylic acid, for example formic acid, acetic acid, propionic acid or lactic acid, and from 0 to 200 parts of further additives, such as urea, ε-caprolactam or polyethylene glycol, per 100 parts of dye.

The aqueous concentrates according to the invention, which are stable at storage temperatures of up to −5° C., are suitable for the dyeing of paper, on which they produce attractive red to violet shades. The dyes of the formula (1), (2) or (3) can additionally be employed for the dyeing of textile materials of cellulose, for example cotton, and for the dyeing of leather and glass fibres.

In the examples which follow, parts and percentages are by weight and the temperatures are in degrees Celsius.

EXAMPLE 1

26.7 parts of the compound of the formula

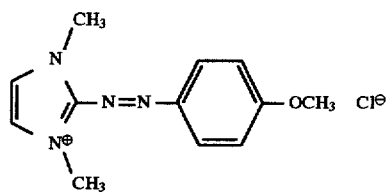

are stirred together with 13 parts of p-phenylenediamine in 50 parts of isopropanol. 24 parts of isopropanol are distilled off under nitrogen at a bath temperature of 100° C. The bath temperature is lowered to 90° C. and the reaction mass is stirred at this temperature for 16 hours. The heating bath is then removed and the isopropanol distilled off previously is added again dropwise. The mixture is stirred until it reaches room temperature and is filtered, and the solid product is washed thoroughly with isopropanol and dried, to give 34 parts of a black crystal powder of which 92% by weight comprises the compound of the formula

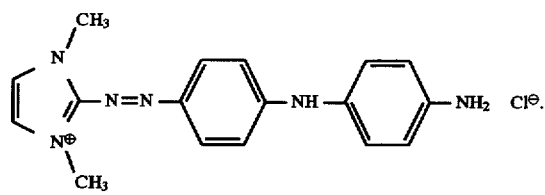

It can be obtained in a pure form by recrystallization from ethanol. It dyes textile material of polyacrylonitrile, mechanical paper and hair in violet shades.

EXAMPLE 2

62.2 parts of the compound of the formula

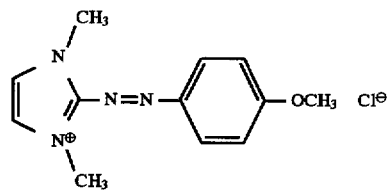

as salt-containing crude product with a purity of 85.8% by weight in 43 parts of dimethylformamide are heated with 21.6 parts of p-phenylenediamine to 115° C. After 4.5 hours, the reaction mass is cooled with stirring to 100° C., the heating bath is removed, and 140 parts of methyl isobutyl ketone are added dropwise over the course of 60 minutes. After cooling, the precipitate - which comprises well-formed crystals—is filtered off with suction and washed with methyl isobutyl ketone. Drying gives 69.6 parts of a dark crystal powder of which 80% comprises the same violet compound obtained according to Example 1.

EXAMPLE 3

11.2 parts of the compound obtained according to Example 1 in 80 parts of water are stirred together with 2.77 parts of cyanuric chloride at room temperature, the pH being maintained at a constant value of 6 by addition of 30% strength sodium hydroxide solution. After 2 hours, the temperature is raised to 35° C., and after a further 3.5 hours it is raised to 45° C. After 6 hours, the reaction is at an end. 8 parts of sodium chloride are added and the mixture is filtered at 50° C. The filter cake is washed with 5% strength sodium chloride solution and dried, to give 15 parts of a dark, salt-containing powder which consists principally of the violet dye of the formula 5,708,151

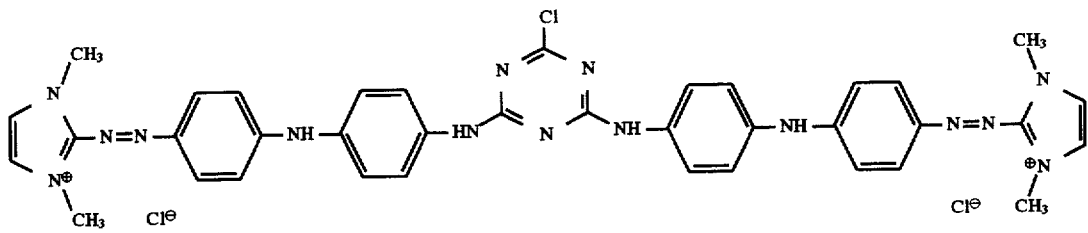

The dye dyes bleached cellulose in clear violet shades and shows excellent affinity for this material.

EXAMPLE 4

40 parts of the starting compound from Example 1 are stirred together with 20 parts of piperazine in 80 parts of isopropanol at 60° C. for 2 hours, the mixture is cooled, and the small quantity of precipitated dicondensation product is filtered off. 380 parts of tert-butyl methyl ether are added slowly to the mother liquor, and the precipitated product is filtered off. The filter cake is redissolved in 80 parts of isopropanol and again precipitated with tert-butyl methyl ether. Drying gives 46 parts of a violet crystal powder of the formula

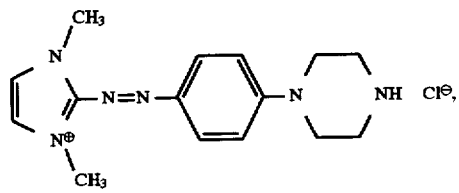

which is suitable for dyeing textile material of polyacrylonitrile, mechanical paper and hair in violet shades.

EXAMPLE 5

38 parts of the starting compound from Example 1 are stirred together with 70 parts of melted hexamethylenediamine at 85° C. for 2 hours, the mixture is then cooled to 50° C., and parts of tert-butyl methyl ether are added slowly. The precipitated product is filtered off with suction and the residue is dissolved while still hot in 70 parts of isopropanol and cooled again. 190 parts of tert-butyl methyl ether are then added again, and the precipitate is filtered off and dried, to give 43 parts of a violet crystal powder of the formula

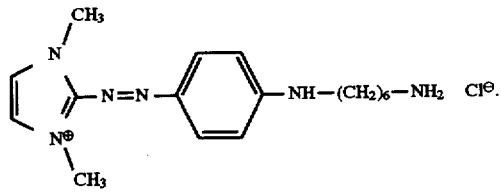

EXAMPLE 6

40 parts of the starting compound from Example 1 are stirred together with 75 parts of 1,3-diaminopropane at 60° C. for 1 hour, the mixture is cooled, and 380 parts of tert-butyl methyl ether are added. The precipitated product is filtered off with suction and the residue is dissolved while still hot in 100 parts of isopropanol and cooled again. 380 parts of tert-butyl methyl ether are then added again, and the precipitate is filtered off and dried, to give 41 parts of a red crystal powder of the formula

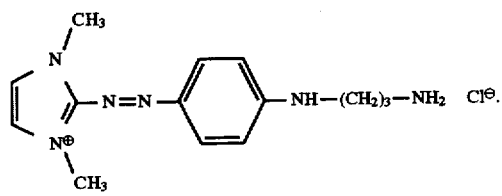

EXAMPLE 7

11.2 parts of the compound obtained according to Example 1 in 80 parts of water are stirred together with 2.77 parts of cyanuric chloride at room temperature, while maintaining the pH at a constant level of 6 by addition of sodium hydroxide solution. After 2 hours, the temperature is raised slowly to 35° C., and after a further hour it is raised to 50° C. After about 5.5 hours, sodium hydroxide solution is no longer consumed. The reaction mass is thereafter heated briefly to 85° C. and, after cooling, 5 parts of a 40% strength aqueous solution of dimethylamine are added. The mixture is stirred in an autoclave for 6 hours at from 90 to 95° C. (pressure about 2 bar) and, after cooling, is filtered. The filter cake is dispersed in 200 parts of water and the dispersion is desalinated for 10 hours in a dialysis tube (Spectra/Por® No. 1). The resulting dye suspension is dissolved with 34 parts of acetic acid. Concentration to 130 parts on a rotary evaporator gives a stable, intensely coloured solution of the dye of the formula

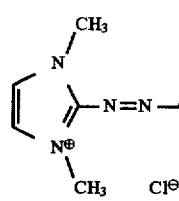
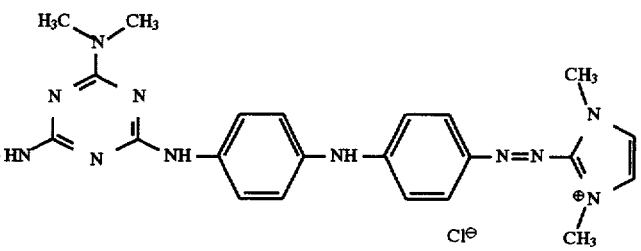

which dyes bleached cellulose in bluish violet shades with excellent fastness properties. A feature worthy of particular mention is the completely colourless effluent which remains after dyeing.

EXAMPLE 8

13.1 parts of the compound obtained according to Example 2 are stirred in 80 parts of water at room temperature. Following the introduction of 2.77 parts of cyanuric chloride, the pH is maintained at a constant level of 6 by addition of 4 M sodium hydroxide solution. After 2 hours, half of the theoretical quantity of sodium hydroxide solution required has been consumed and the reaction becomes slow. The reaction mixture is therefore heated initially to 37° C. and after a further 2.5 hours to 47° C. After a total of 6 hours, the condensation is almost at an end. The reaction mixture is thereafter heated to 85° C., and 1.44 parts of morpholine dissolved in 10 parts of water are added dropwise over the course of 0.5 hour, maintaining the pH at a constant level of 8 by addition of sodium hydroxide solution. Finally, the temperature is raised to 92° C. and the reaction mixture is stirred until no more sodium hydroxide solution is consumed (about 2.5 hours). After cooling with stirring, the solid product is filtered off with suction and the filter cake is washed with 2% strength sodium chloride solution. Drying gives 12.5 parts of a dark powder of which more than 90% comprises the dye of the formula

EXAMPLES 9 TO 18

Following the procedure described in Examples 7 and 8 but using, instead of dimethylamine and morpholine, equivalent quantities of the amines listed in the table below, dyes are obtained which are outstandingly suited to the dyeing of bleached cellulose in violet shades which are reddish to a greater or lesser extent.

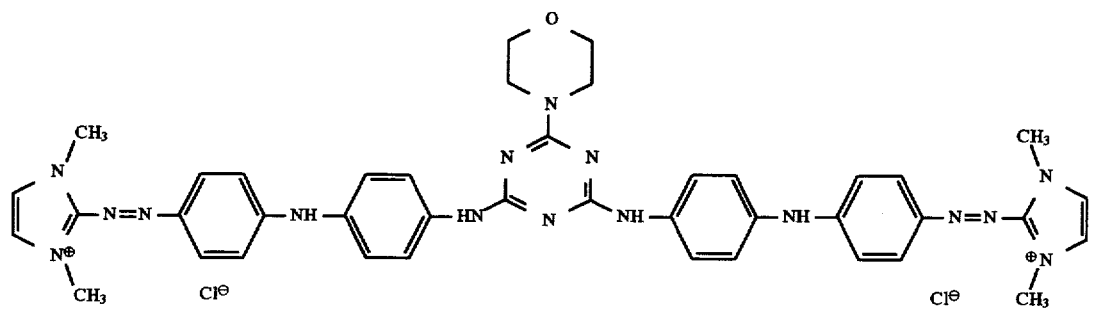

and is outstandingly suitable for the dyeing of bleached cellulose in bluish violet shades having excellent fastness properties.

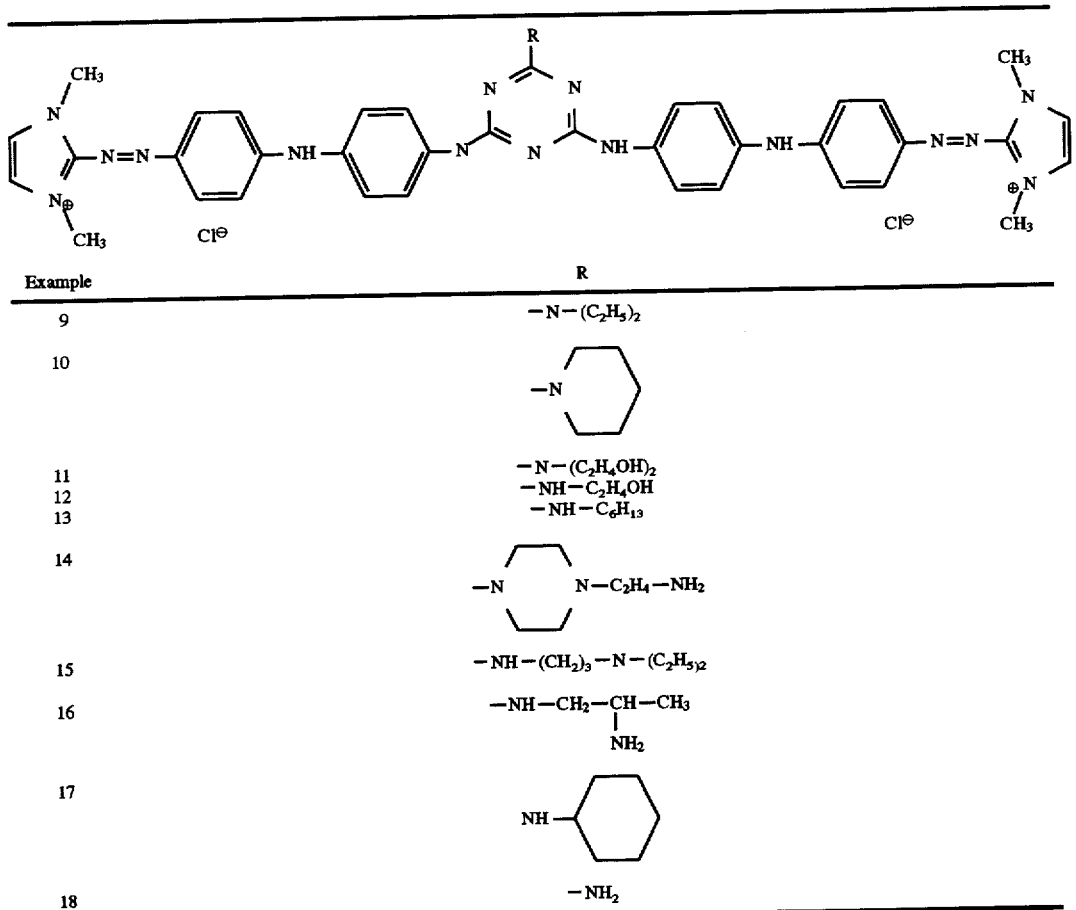

| Example | R |
|---|---|
| 9 | $-N-(C_2H_5)_2$ |
| 10 | -N(piperidine) |
| 11 | $-N-(C_2H_4OH)_2$ |
| 12 | $-NH-C_2H_4OH$ |
| 13 | $-NH-C_6H_{13}$ |
| 14 | $-N\underset{\phantom{.}}{\overset{\phantom{.}}{(piperazinyl)}}N-C_2H_4-NH_2$ |
| 15 | $-NH-(CH_2)_3-N-(C_2H_5)_2$ |
| 16 | $-NH-CH_2-CH(NH_2)-CH_3$ |
| 17 | $NH-$ cyclohexyl |
| 18 | $-NH_2$ |

EXAMPLE 19

15 parts of the compound obtained according to Example 3 are stirred in 80 parts of water. 0.64 part of piperazine is added, the pH subsequently rising from 6.8 to 10.8. The mixture is heated first of all to 75° C. and the pH is kept at a constant level of 9.0 by adding 4M NaOH. After hours, the temperature is raised to 95° C. and maintained at this level for 1.5 hours, and then the mixture is cooled with stirring. The reaction mass is subsequently dialysed as described in Example 7 until coloured compounds no longer emerge (about 70 hours). The contents of the dialysis tube are then concentrated to 310 parts and 45 parts of acetic acid are added to the still hot concentrate. Clarifying filtration through a glass frit gives a residue-free dye solution which contains 3.4% of the dye of the formula

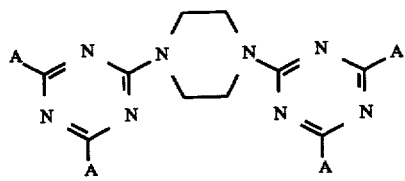

A:

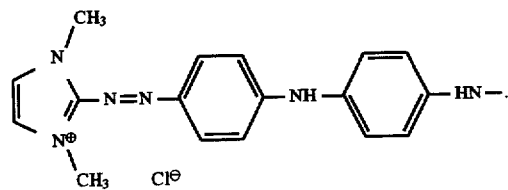

The dye has an outstanding affinity for bleached cellulose and gives violet dyeings having excellent wet fastness properties. The effluents are colourless even in the case of deep dyeings.

EXAMPLE 20

2.87 parts of the compound obtained according to Example 3 are heated in 80 parts of water with 0.2 part of 1,6-diaminohexane at 95° C., the pH being kept at a constant level of 8.5 by addition of 4M NaOH. After about 1 hour the reaction is at an end. The mixture is then cooled with stirring and filtered and the solid product is washed with a little water. Drying gives 2.54 parts of a dark compound of the formula

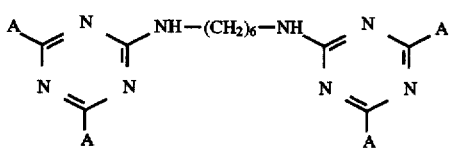

A:

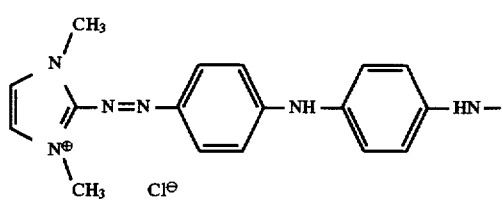

The dye has extraordinarily good affinity for bleached cellulose under all dyeing conditions and gives violet dyeings with excellent wet fastness properties. The effluents are colourless even in the case of deep dyeings.

EXAMPLE 21

2 parts of sodium bicarbonate are dissolved in 30 parts of water. The solution is cooled to a temperature of less than 5° C., 1.84 parts of cyanuric chloride are added, and the mixture is stirred at the same temperature for 2 hours more. The temperature is then allowed to rise slowly to room temperature, and the mixture is stirred further overnight. 7.4 parts of the compound prepared according to Example 1 are added to the clear solution resulting from overnight stirring, and the temperature is raised to 75° C. over the course of 2 hours, the pH being maintained at a constant level of 7 by addition of 4 M sodium hydroxide solution. When sodium hydroxide solution is no longer consumed, the mixture is cooled with stirring and filtered, and the solid product is washed with water. The moist residue is dissolved while still hot with 120 parts of a mixture of methanol and ethanol, and after the mixture has cooled it is again filtered and washed. Drying gives 6.8 parts of a dark powder of the formula containing 1.1 parts of the compound prepared according to Example 1 at 95° C. for 5 hours, the pH being maintained at a constant level of 7 by addition of sodium hydroxide solution. The mixture is then cooled with stirring, 5 parts of NaCl are added, and the mixture is filtered after half an hour. The residue is suspended in 150 parts of hot water, the suspension is cooled and then adjusted to a pH of 3 using HCl, and the product is then salted out again with 3 parts of NaCl. Filtration and drying give 3.9 parts of a dark powder whose principal constituent is the dye of the formula

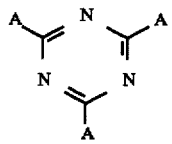

A:

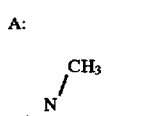

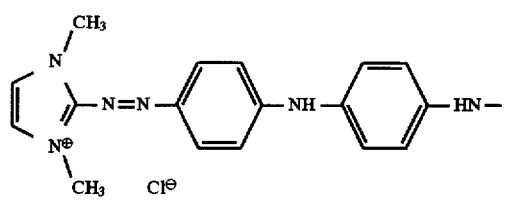

and which is outstandingly suited to the dyeing of bleached cellulose in bluish violet shades.

EXAMPLE 23

1.3 parts of the compound prepared according to Example 1 are dissolved in 10.5 parts of 1M HCl and 30 parts of water and the solution is cooled to 0° to 5° C. 3.5 parts of 1M sodium nitrite solution are then added dropwise over the course of 15 minutes. Any excess of nitrite is then destroyed by adding sulfamic acid.

The resulting diazo solution is slowly added dropwise to an ice bath-cooled solution of 2 parts of the coupling component of the formula

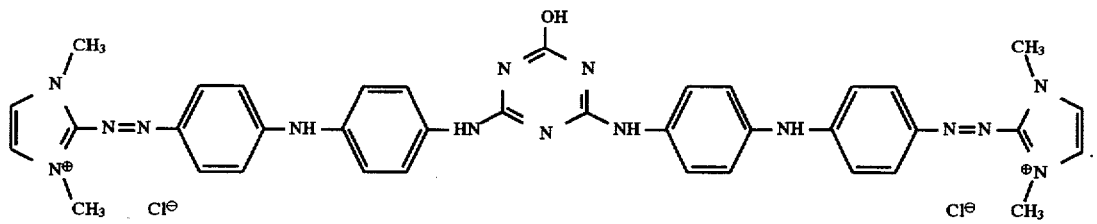

The dye is highly suitable for the dyeing of bleached cellulose in violet shades.

EXAMPLE 22

2.9 parts of the compound prepared according to Example 3 with a purity of 83% are heated in 60 parts of water

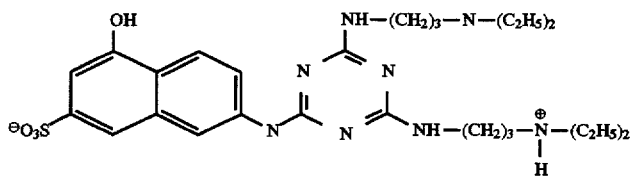

dissolved in 40 parts of water, while maintaining the pH at a constant level of 7. After the addition is over, the ice bath is removed and the mixture is stirred at room temperature for 2 hours more. It is then adjusted to a pH of 11, the precipitate is filtered off with suction, and the residue is washed with water and dried, to give 3 parts of a dark dye powder whose principal component has the formula

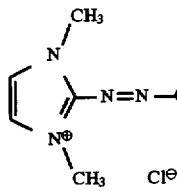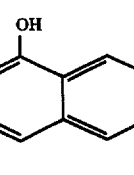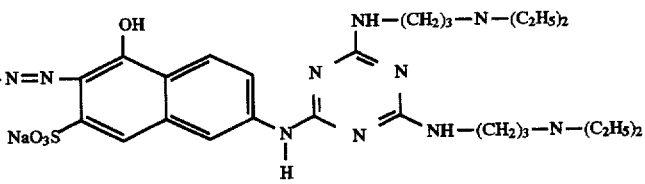

and dyes bleached cellulose in a grey-blue shade.

EXAMPLE 24

Following the procedure described in Example 23 but using 0.44 part of triaminopyrimidine as coupling component, 1.57 parts of the dye of the formula

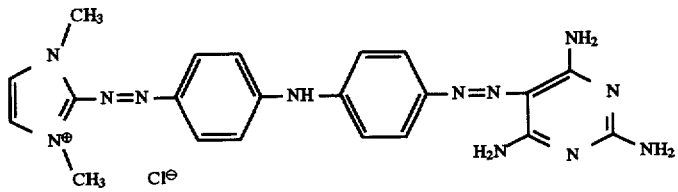

are obtained, which dyes bleached cellulose in very intense grey-violet shades and has a very good affinity for this material.

EXAMPLE 25

Following the procedure described in Example 23 but using 0.72 part of acetoacetic acid o-anisidide as coupling component, 1.8 parts of the dye of the formula

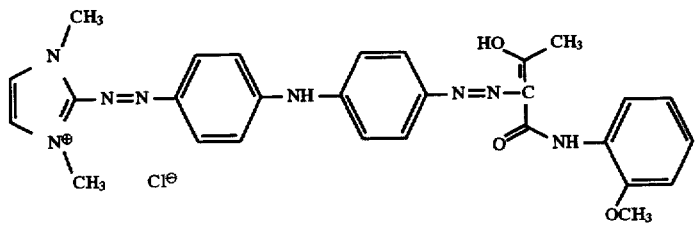

are obtained, which dyes bleached cellulose in very intense grey-violet shades and has a very good affinity for this material.

EXAMPLE 26

0.92 part of cyanuric chloride in 100 parts of water is stirred together with 0.53 part of diethanolamine at a temperature of between 0° and 5° C. 8 parts of acetone are added in order to accelerate the reaction, and the pH is maintained at a constant level of 6 by dropwise addition of 1M NaOH. After 1.5 hours the ice bath is removed, after a further hour 1.6 parts of the compound obtained according to Example 4 are added to the whim suspension, and the temperature is raised slowly to 40° C., maintaining the pH at 7. After one hour more, a further 1.6 parts of the compound obtained according to Example 4 are added and the temperature is raised to 85° C. The acetone added distills off. After 1.5 hours the reaction is at an end, the reaction mixture is cooled to 50° C., 2.5 parts of NaCl are added and the mixture is filtered. Drying gives 4.55 parts of a salt-containing dye powder of the formula

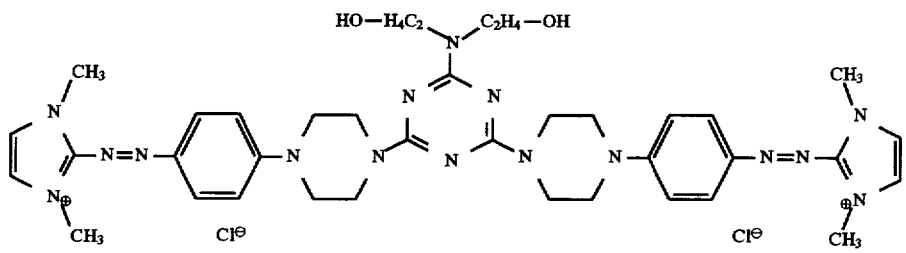

EXAMPLE 27

7.1 parts of the compound obtained according to Example 5 in 500 parts of water are stirred together with 3.68 parts of cyanuric chloride at a constant pH of 8 at room temperature. After 0.75 hour, a further 7.1 parts of the compound obtained according to Example 5 are added. After about 2 hours, the temperature is raised gradually to 38° C. After a further 2 hours, the mixture is cooled with stirring, and then 22 parts of sodium chloride are added. The mixture is stirred for an hour and filtered, and the solid product is washed with NaCl solution and dried to give 27 parts of a highly salt-containing powder of which 60% by weight comprises the red dye of the formula

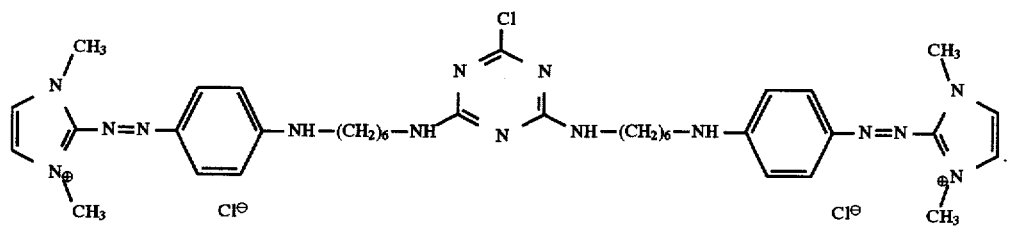

0.8 part of a 10% strength aqueous solution of piperazine is added to 2.7 parts of this powder in 80 parts of water and the mixture is stirred for 6 hours at a temperature of 95° C., the pH being maintained at a constant level of 8.5 by addition of 1M NaOH. The mixture is cooled with stirring and the supernatant solution is decanted to give a resinous residue. This residue is dissolved in 50 parts of methanol while still hot. Then 100 parts of isopropanol are added, the methanol is distilled off, and the solution which remains is subjected to clarifying filtration. The isopropanolic mother liquor is concentrated to dryness by forceful evaporation, to give 1.4 parts of a red dye of the formula

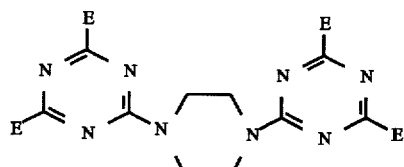

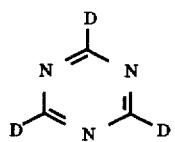

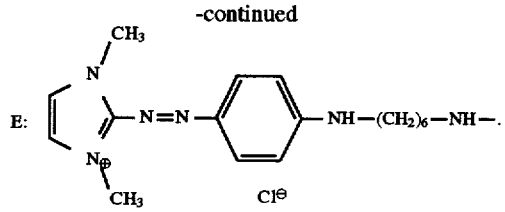

This dye is outstandingly suited to the dyeing of bleached cellulose in bright red shades with excellent fastness properties.

EXAMPLE 28

14.4 parts of the compound obtained according to Example 4 in 400 parts of water are stirred together with 2.77 parts of cyanuric chloride at from 0 to 5° C. The pH is maintained at between 7 and 8 by addition of 4M NaOH and the temperature is raised to 95° C. over the course of 5 hours. After a further 1.5 hours, the reaction is at an end. 30 parts of sodium chloride are added, and the mixture is cooled and filtered. The residue is recrystallized from 250 parts of water. Drying gives 14 parts of a violet crystal powder of the formula

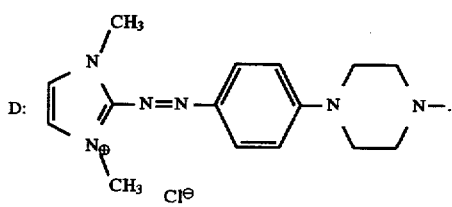

The dye dyes bleached cellulose in bluish red shades. The effluents are entirely colourless even in the case of deep dyeings.

EXAMPLE 29

16.1 parts of the compound obtained according to Example 6 are stirred in 250 parts of water and 8 parts of acetone. At a temperature between 5° and 10° C., 4.6 parts of cyanuric chloride are added and the pH is maintained at between 7 and 8 by addition of 4M NaOH. The temperature is then raised to 45° C. over the course of 3 hours. After a further 1.5 hours at this temperature, the reaction is at an end. The gelatinous reaction mixture is concentrated to about 20%, 50 parts of hot methanol and then 100 parts of isopropanol are added, and the product is precipitated by addition of 320 parts of tert-butyl methyl ether. The precipitated dye is filtered and dried, to give 18.6 parts of the compound of the formula -continued G:
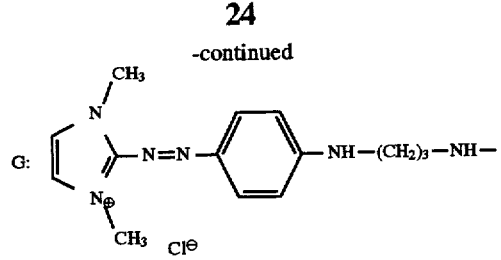

are obtained which dyes bleached cellulose in bright red shades with excellent fastness properties.

EXAMPLE 30

18.4 parts of cyanuric chloride are dissolved in 80 parts of acetone at 0° C. To this solution is added over the course of 1 hour a solution of 9.3 parts of freshly distilled aniline in 40 parts of acetone, while the temperature is maintained at between 0° and 10° C. The ice bath is removed and the mixture is subsequently stirred at room temperature for 2

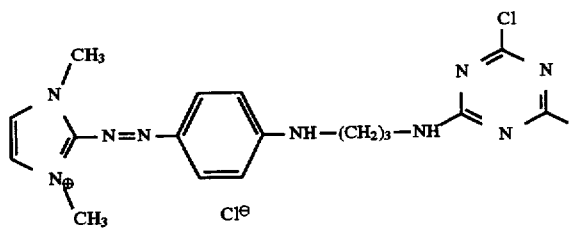

3 parts of this compound are heated in 80 parts of water containing 0.23 part of 1,6-hexamethylenediamine to 90° to 95° C., maintaining the pH at between 8.5 and 9 by addition of 1M NaOH. After 7 hours the reaction mixture is concentrated to dryness, the residue is taken up in 50 parts of methanol while still hot, undissolved salts are removed by filtration, and the filtrate is evaporated to dryness again. 3.3 parts of the dye of the formula hours, to give a clear solution. 300 parts of water are added dropwise, and an oil separates out. The pH is increased from 0.5 to 4.5 by dropwise addition of 4M NaOH. During this addition, 2,4-dichloro-6-anilino-1,3,5-triazine is deposited as a white suspension. The suspension is filtered and the solid product is washed with water to give, after drying, 23.1 parts of a white powder.

4.8 parts of this powder in 100 parts of water are stirred with 7 parts of the compound prepared according to Example 5 at 60° C. for 5 hours, while maintaining the pH at a constant level of 7. The mixture is cooled with stirring and filtered and the solid product is dried to give 10 parts of the compound of the formula

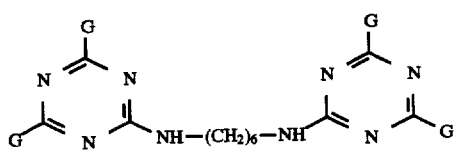

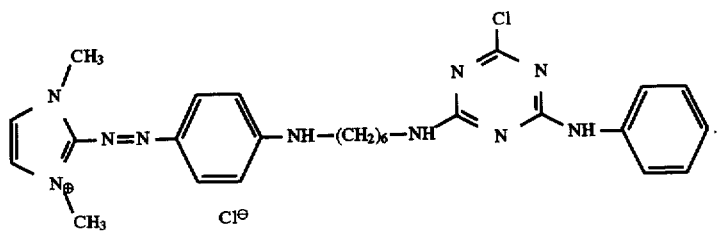

2.45 parts of this compound are heated with 1.55 parts of the compound prepared according to Example 5 in 80 parts of water for 5.5 hours at from 90 to 95° C., the pH being maintained at a constant level of 8. After the mixture has cooled it is decanted to leave the oily product, and the oil is dried, taken up in 40 parts of ethanol and subjected to clarifying filtration to remove undissolved salts. 35 parts of a 10.8% strength solution of the dye of the formula

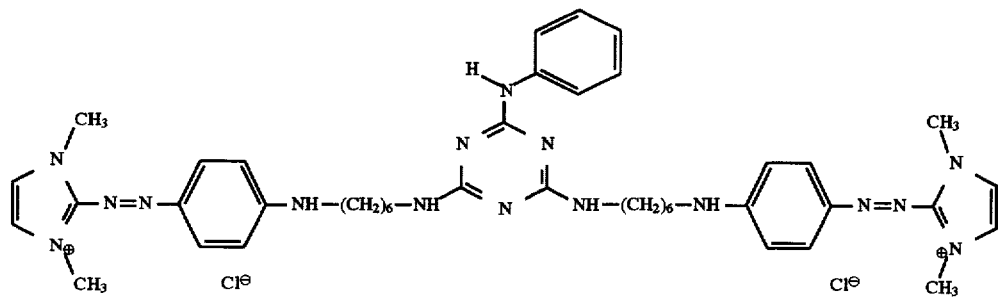

are obtained, which dyes bleached cellulose in bright red shades with very good fastness properties.

EXAMPLE 31

By a procedure analogous to that described in Example 6, the compound of the formula

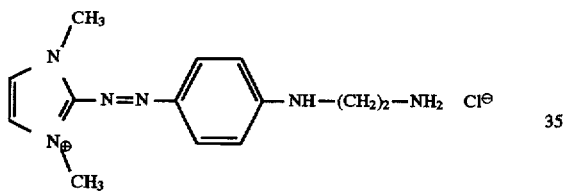

is prepared. 5.9 parts of this compound are dissolved in 80 parts of water, and a solution of 2 parts of terephthaloyl dichloride in 16 parts of acetone is added over the course of 30 minutes at a temperature of 5° C. During this addition, the pH is maintained at 11.5 using 4M NaOH. The temperature is then allowed to rise to room temperature and stirring is continued for 4 hours. The pH is then adjusted to 1.5 using about 0.7 part of concentrated HCl, the mixture is filtered, and the solid product is washed with water and dried, to give 6.7 parts of the dye of the formula

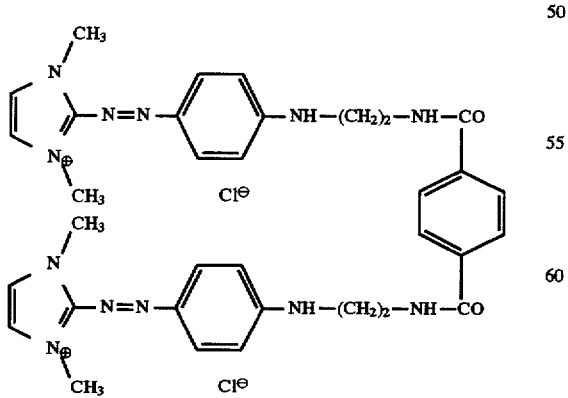

which is highly suitable for dyeing cellulose in red shades.

EXAMPLE 32

A solution of 8 parts of the compound of the formula

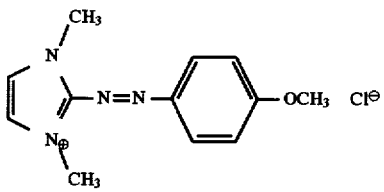

and 3.1 parts of 1,12-diaminododecane in 20 parts of ethanol is heated at 60° C. for 20 hours. After cooling it is filtered and the filter cake is dissolved in 50 parts of methanol. 50 parts of ethanol are added, the methanol is distilled off, and the product is left to crystallize out. Filtration and drying give 5 parts of the dye of the formula

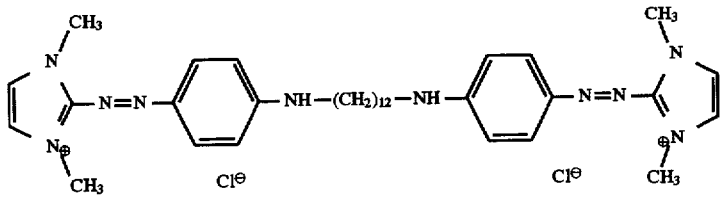

which dyes bleached cellulose in very bright red shades with excellent fastness properties.

EXAMPLE 33

3.2 parts of the product from Example 4 are dissolved in 100 parts of water, and 0.92 part of finely ground cyanuric chloride is added at 5° C. After one hour the ice bath is removed and the reaction mass is heated to 50° C. over the course of 3 hours. The pH is maintained at 7 by addition of 1M sodium hydroxide solution. After about 4 hours, the starting material can no longer be detected in the thin-layer chromatogram. 1.7 parts of the product from Example 1 are then added and the mixture is heated to 95° C. and maintained at this temperature and a pH of 8 for 10 hours. The reaction solution is subsequently dialysed as described in Example 7, concentrated to 130 parts and almost completely dissolved by addition of 10 parts of glacial acetic acid. It contains the dye of the formula and dyes bleached cellulose in a red-violet shade with good fastness properties.

EXAMPLE 34

4 parts of the product according to Example 3 are heated in 100 parts of water with 1.6 parts of the product from Example 4 for 3 hours at 85° C., the pH being maintained at a constant level of 7.5 by addition of sodium hydroxide solution. The mixture is cooled with stirring, desalinated by dialysis as described in Example 7 and concentrated to dryness, to give 4.3 parts of the dye of the formula

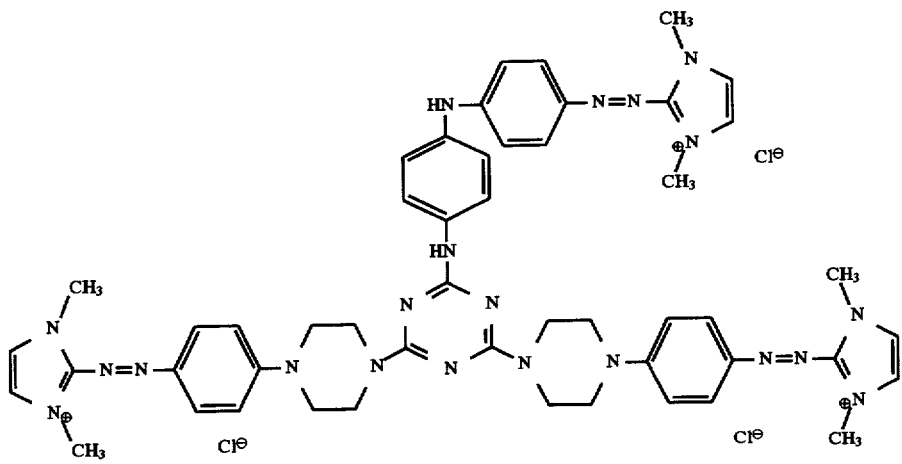

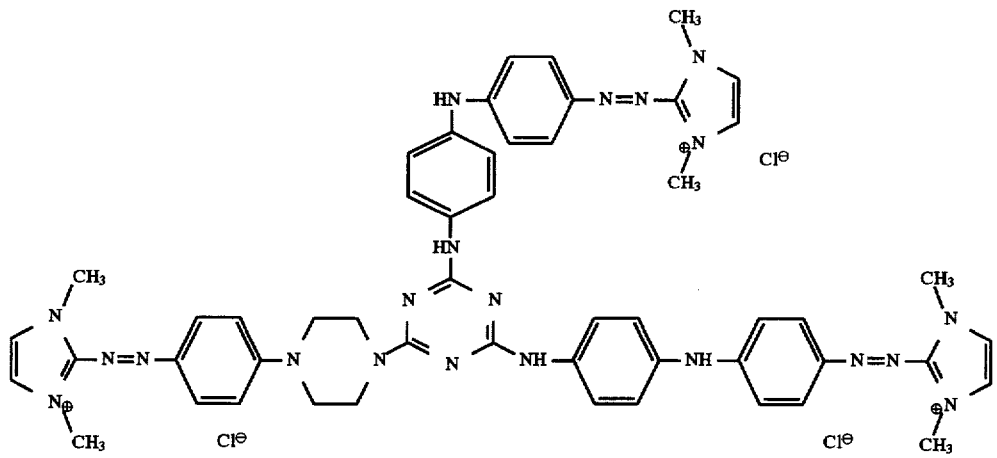

which is outstandingly suited to the dyeing of bleached cellulose. The shade of the dyeings is approximately midway between the very reddish violet of Example 33 and the bluish violet of Example 7.

EXAMPLE 35

0.92 part of cyanuric chloride is suspended in 100 parts of water at <5° C. A solution of 0.53 part of diethanolamine in 8 parts of acetone is then added and the pH is maintained at 6 by addition of sodium hydroxide solution. After 2 hours the cooling is removed, the pH is adjusted to 7 and the mixture is stirred at 20° C. for 2 hours more. Then 1.7 parts of the product from Example 1 are added and the mixture is slowly heated to 40° C. When coloured starting material can no longer be seen in the thin-layer chromatogram, a further 1.6 parts of the product from Example 4 are added and the entire mixture is stirred at 80° C. and a pH of 8.5 for 4 hours. It is cooled with stirring, desalinated by dialysis as described in Example 7, concentrated to 90 parts and dissolved with 10 parts of glacial acetic acid. The resulting dye has the formula

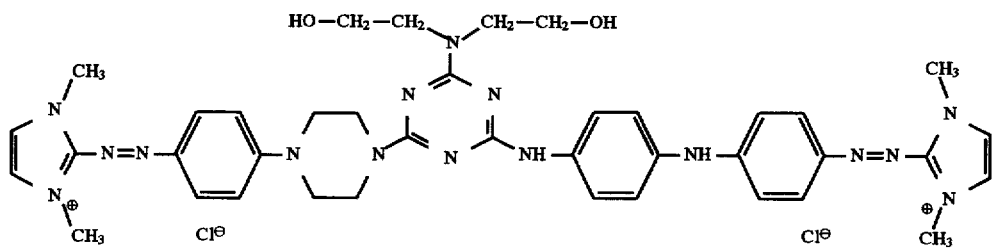

and is likewise outstandingly suitable for the dyeing of bleached cellulose. The shade is somewhat more reddish than the violet of Example 34.

EXAMPLE 36

50 parts of chemically bleached beechwood sulfite pulp are mixed with 50 parts of bleached pinewood pulp RKN 15 (freeness 22° SR) and 0.2 part of the dye according to Example 7 in water (pH 6, water of 10° German hardness [dH], temperature 20°, liquor ratio 1:40). After stirring for 15 minutes, sheets of paper are produced on a Frank sheet-former.

The paper has an intense violet colouration. The effluent is completely colourless. The degree of exhaustion reaches almost 100%. The wet fastness properties are excellent.

EXAMPLE 37

A paper web is produced from bleached beechwood sulfite pulp (22° SR) on a continuous laboratory papermaking machine. Ten seconds before the headbox, an aqueous solution of the dye according to Example 8 is metered continuously into the thin pulp with strong turbulence (0.3% strength dyeing, liquor ratio 1:400, water hardness 10° dH, pH 6, temperature 20°).

An intense violet dyeing is produced on the paper web. The effluent is completely colourless.

EXAMPLE 38

Analogously to the procedure of Example 36, 100 parts of ground woodpulp are dyed with 1 part of the dye from Example 1. A violet dyeing having good fastness properties is obtained. The effluent is completely colourless.

EXAMPLE 39

The procedure of Example 36 is followed but using as dye a mixture of 0.085 part of the dye from Example 7 and 0.49 part of the dye of the formula

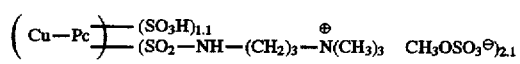

in which Cu-Pc denotes the copper phthalocyanine radical. A reddish blue dyeing on paper is obtained.

EXAMPLE 40

The procedure of Example 36 is followed but using as dye a mixture of 0.043 part of the dye from Example 8 and 0.735 part of the dye of the formula

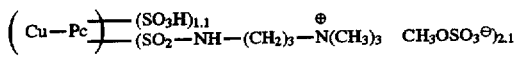

in which Cu-Pc denotes the copper phthalocyanine radical. A neutral blue dyeing on paper is obtained.

EXAMPLE 41

Paper with a similarly neutral blue dyeing is obtained following the procedure described in Example 40 but using a mixture of 0.073 part of the dye from Example 15 (prepared by the method described in Example 8) and 0.7 part of the dye of the formula

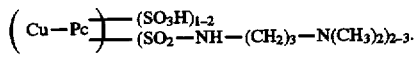

What is claimed is:

1. A compound of the formula

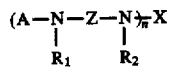      (1)

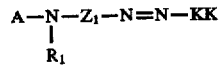      (2)

and

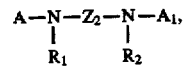      (3)

in which A and $A_1$ independently of one another are each a radical of the formula

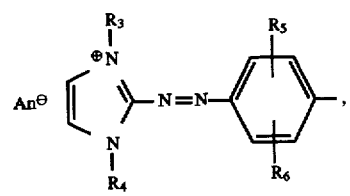      (4)

Z is the radical of an aliphatic or aromatic diamine, $R_1$ and $R_2$ independently of one another are each hydrogen $C_1$–$C_4$alkyl or $C_1$–$C_4$alkyl which is substituted by hydroxyl, carboxyl, halogen, cyano or $C_1$–$C_4$alkoxy or $C_1$–$C_4$alkoxy which is substituted by hydroxyl or $C_1$–$C_4$alkoxy, or by amino, alkylamino, dialkylamino, aminocarbonyl, phenyl, phenoxy or phenylaminocarbonyl in which the phenyl group is unsubstituted or substituted by $C_1$–$C_4$alkyl, $C_1$–$C_4$alkoxy or phenoxy or, together with the two nitrogen atoms to which they are attached and with Z, form a piperazino ring, X is the radical of phosgene, succinyl dichloride, oxalyl dichloride, terephthaloyl dichloride, ethylene dibromide, xylene dichloride or of a dihalotriazine of the formula

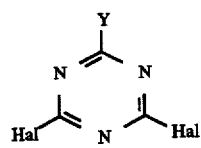      (5)

or

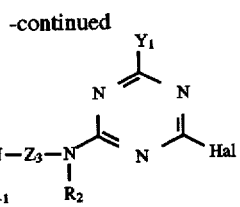      (6)

in which

Hal is halogen,

Y and $Y_1$ independently of one another are each a radical A of the formula (4), or are halogen, hydroxyl, amino, monoalkylamino dialkylamino, 1-piperidino, morpholino or 1-piperazino, where the 1-piperazino radical is unsubstituted or substituted by $C_1$–$C_4$alkyl at the nitrogen atom not attached to the triazine ring and wherein the alkyl groups are unsubstituted or substituted by hydroxyl, amino, mono-$C_1$–$C_4$alkylamino or di-$C_1$–$C_4$alkylamino, $Z_1$ is the radical of an aromatic diamine, $Z_2$ is the radical of an aliphatic diamine, KK is the radical of a coupling component, $R_3$ and $R_4$ independently of one another are each hydrogen, $C_1$–$C_4$alkyl or $C_1$–$C_4$alkyl which is substituted by hydroxyl, carboxyl, halogen, cyano, $C_1$–$C_4$alkoxy or $C_1$–$C_4$alkoxy which is substituted by hydroxyl or $C_1$–$C_4$alkoxy, or by amino, alkylamino, dialkylamino, aminocarbonyl, phenyl, phenoxy or phenylaminocarbonyl in which the phenyl group is unsubstituted or substituted by $C_1$–$C_4$alkyl, $C_1$–$C_4$alkoxy or phenoxy, $R_5$ and $R_6$ independently of one another are each hydrogen, unsubstituted $C_1$–$C_4$alkyl or $C_1$–$C_4$alkoxy or $C_1$–$C_4$alkyl or $C_1$–$C_4$alkoxy which is substituted by hydroxyl, carboxyl, halogen, cyano or $C_1$–$C_4$alkoxy, or $C_1$–$C_4$alkoxy which is substituted by hydroxyl or $C_1$–$C_4$alkoxy, or by amino, alkylamino, dialkylamino, aminocarbonyl, phenyl, phenoxy or phenylaminocarbonyl in which the phenyl group is unsubstituted or substituted by $C_1$–$C_4$alkyl, $C_1$–$C_4$alkoxy or phenoxy and $An^\ominus$ is a colourless anion.

2. A dye according to claim 1, which is of the formula (1) in which Z is the radical of an alkylenediamine whose alkylene groups are straight-chain, branched or cyclic and are unsubstituted or substituted by halogen, alkoxy or hydroxy, where the alkylene chains is uninterrupted or interrupted by —O— or —$NR_1$—, or Z is 1,4-naphthylene or 1,4-phenylene which is unsubstituted or substituted by alkyl, alkoxy or halogen, or Z, together with the two adjacent nitrogen atoms and $R_1$ and $R_2$, forms a piperazine ring.

3. A dye according to claim 2, wherein Z is an unsubstituted $C_2$–$C_8$alkylene or Z, together with the two adjacent nitrogen atoms and $R_1$ and $R_2$, forms a piperazine ring, or Z is an unsubstituted phenylene or naphthylene.

4. A dye according to claim 1, which is of the formula (2) in which $Z_1$ is 1,4-naphthylene or 1,4-phenylene which is unsubstituted or substituted by alkyl, alkoxy or halogen.

5. A dye according to claim 1, which is of the formula (3) in which $Z_2$ is the radical of an alkylenediamine whose alkylene groups are straight-chain, branched or cyclic and unsubstituted or substituted by halogen, alkoxy or hydroxy, in which the alkylene chains is uninterrupted or interrupted by —O— or —$NR_1$—, or Z, together with the two adjacent nitrogen atoms and $R_1$ and $R_2$, forms a piperazine ring.

6. A dye according to claim 1, wherein A and $A_1$ are each radicals of the formula (4) in which $R_3$ and $R_4$ are methyl or ethyl.

7. A dye according to claim 1, wherein A and $A_1$ are each radicals of the formula (4) in which $R_5$ and $R_6$ am methoxy, methyl or hydrogen.

8. A dye according to claim 1, wherein X is a radical of a compound of the formula (5) or (6).

9. A dye according to claim 8, wherein $Z_3$ is a $C_2$–$C_8$alkylene radical or, together with the two adjacent nitrogen atoms and $R_1$ and $R_2$, forms a piperazine ring.

10. A dye according to claim 1 or 8, wherein $Z_3$ is a $C_2$–$C_8$alkylene radical or, together with the two adjacent nitrogen atoms and $R_1$ and $R_2$, forms a piperazine ring.

11. A dye according to claim 1, wherein Hal is chlorine.

12. A dye according to claim 1, wherein KK is a coupling component selected from the group consisting of acylacetarylamides, phenols, pyridones, quinolones, pyrazoles, indoles, diphenylamines, anilines, aminopyridines, pyrimidines, pyrimidones, naphthylamines, aminothiazoles, thiophenes and hydroxypyridines, which are unsubstituted or substituted by hydroxyl, amino, alkylamino, dialkylamino, halogen, alkoxy, aryl, aryloxy, alkylcarbonylamino, arylcarbonylamino, alkylsulfonylamino or sulfo.

13. A dye according to claim 12, wherein KK is a coupling component selected from the group consisting of acetoacetanilides, phenols, anilines, diphenylamines, naphthylamines, indoles, quinolines, pyridones, pyrazoles, quinolones and aminopyridines, which are unsubstituted or substituted by hydroxyl, amino, alkylamino, dialkylamino, halogen, alkoxy, aryl, aryloxy, alkylcarbonylamino, arylcarbonylamino, alkylsulfonylamino or sulfo.

14. A dye according to claim 13, wherein KK is the radical of a naphthol-sulfonic acid, an acetoacetanilide or triamino- or trihydroxypyrimidine.

15. A dye according to claim 1, wherein the anion is a chloride, hydrogen sulfate, sulfate, methosulfate, phosphate, formate, lactate or acetate.

16. A dye of the formula $$\left( \begin{array}{c} \text{An}^{\ominus} \bigg[ \underset{R_4}{\underset{|}{N}} \underset{\overset{|}{\oplus N}}{\overset{R_3}{\vert}} \bigg] - N = N - \underset{R_6}{\underset{|}{\bigcirc}} \overset{R_5}{\underset{|}{\phantom{\bigcirc}}} - \underset{R_1}{\underset{|}{N}} - Z - \underset{R_2}{\underset{|}{N}} - X \end{array} \right)_n \tag{7}$$

in which

Z is a phenylene or naphthylene radical or an unsubstituted $C_2$–$C_8$alkylene radical, or in which Z, together with the two adjacent nitrogen atoms and $R_1$ and $R_2$, forms a piperazine ring, $R_1$ and $R_2$ independently of one another are each methyl or hydrogen, $R_3$ and $R_4$ independently of one another are each methyl or ethyl, $R_5$ and $R_6$ independently of one another are each methoxy, methyl or hydrogen, n is 2, 3 or 4, $An^{\ominus}$ is a colourless anion and X is the radical of a bridging member selected from the group consisting of phosgene, succinyl dichloride, oxalyl dichloride, terephthaloyl dichloride, ethylene dibromide, xylene dichloride and dihalotriazines of the formula $$\begin{array}{c} Y \\ \| \\ N \diagup \diagdown N \\ \| \phantom{xx} \| \\ \text{Hal} \diagdown N \diagup \text{Hal} \end{array} \tag{5}$$

$$\begin{array}{c} Y \phantom{xxxxxxxxx} Y_1 \\ \| \phantom{xxxxxxxxx} \| \\ N \diagup \diagdown N \phantom{xxx} N \diagup \diagdown N \\ \| \phantom{xx} \| \phantom{xxx} \| \phantom{xx} \| \\ \text{Hal} \diagdown N \diagup N - Z_3 - N \diagdown N \diagup \text{Hal,} \\ \phantom{xxxxx} | \phantom{xxxxxx} | \\ \phantom{xxxxx} R_1 \phantom{xxxxx} R_2 \end{array} \tag{6}$$

in which

Hal is chlorine,

Y and $Y_1$ independently of one another are each a radical A of the formula $$\text{An}^{\ominus} \bigg[ \underset{R_4}{\underset{|}{N}} \underset{\overset{|}{\oplus N}}{\overset{R_3}{\vert}} \bigg] - N = N - \underset{R_6}{\underset{|}{\bigcirc}} \overset{R_5}{\underset{|}{\phantom{\bigcirc}}} , \tag{4}$$

or are chlorine, hydroxyl, amino, mono-$C_1$–$C_8$alkylamino, di-$C_1$–$C_8$alkylamino, 1-piperidino or 1-piperazino, in which case the 1-piperazino radical can be substituted by $C_1$–$C_4$alkyl at the nitrogen atom not attached to the triazine ring, and in which the alkyl groups are unsubstituted or substituted by hydroxyl, amino, mono-$C_1$–$C_4$alkylamino or di-$C_1$–$C_4$alkylamino, and $Z_3$ is a $C_2$–$C_8$alkylene radical or, together with the two adjacent nitrogen atoms and $R_1$ and $R_2$, forms a piperazine ring.

17. A dye according to claim 16, in which Z is a 1,4-phenylene radical or an unsubstituted $C_3$–$C_6$alkylene radical or in which Z, together with the two adjacent nitrogen atoms and $R_1$ and $R_2$, forms a piperazine ring.

18. A process for the preparation of a dye of the formula (1) according to claim 1, which comprises reacting a compound of the formula $$\text{An}^{\ominus} \bigg[ \underset{R_4}{\underset{|}{N}} \underset{\overset{|}{\oplus N}}{\overset{R_3}{\vert}} \bigg] - N = N - \underset{R_6}{\underset{|}{\bigcirc}} \overset{R_5}{\underset{|}{\phantom{\bigcirc}}} - \underset{R_3}{\underset{|}{N}} - Z - \underset{R_2}{\underset{|}{N}} - H \tag{8}$$

with a bridging member of the formula Hal-X-Hal, in which $R_1$, $R_2$, $R_3$, $R_4$, $R_5$, $R_6$, Z and $An^{\ominus}$ are as defined under formulae (1) and (4), and Hal is fluorine, bromine, iodine or chlorine.

19. A compound of the formula

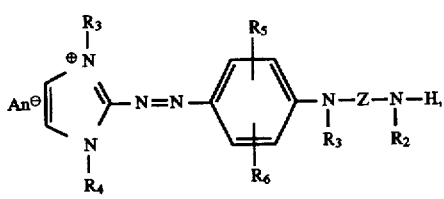
(8)

in which $R_1$, $R_2$, $R_3$, $R_4$, $R_5$, $R_6$, Z and $An^\ominus$ are as defined under formulae (1) and (4) in claim 1.

20. A process for the preparation of a compound of the formula (8) according to claim 19, which comprises reacting a compound of the formula

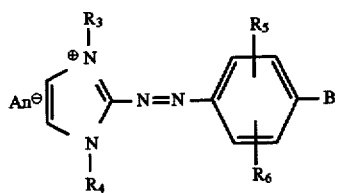
(9)

with a diamine of the formula

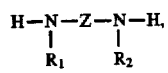
(10)

in which

B is alkoxy or halogen, and $R_1$, $R_2$, $R_3$, $R_4$, $R_5$, $R_6$, Z and $An^\ominus$ are as defined under formulae (1) and (4).

21. A method of dyeing hair, which comprises treating the hair with an effective amount of a dye of the formula (8) according to claim 19.

22. A process for the preparation of a dye of the formula (2) according to claim 1, which comprises diazotizing a compound of the formula

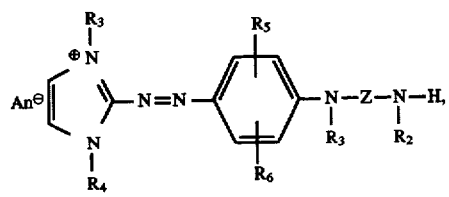
(8)

in which $R_1$, $R_2$, $R_3$, $R_4$, $R_5$, $R_6$, Z and $An^\ominus$ are as defined under formulae (1) and (4) and $R_2$ is hydrogen, and coupling the product with a coupling component KK.

23. A process for the preparation of a dye of the formula (3) according to claim 1, which comprises reacting a compound of the formula

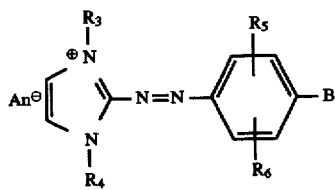
(9)

with a diamine of the formula

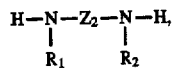
(3a)

in which

B is alkoxy or halogen, and $R_1$, $R_2$, $R_3$, $R_4$, $R_5$, $R_6$, $Z_2$ and $An^\ominus$ are as defined under formulae (1) and (4).

24. A method of dyeing paper, which comprises treating the paper with with an effective amount of a dye of the formula (1), (2) or (3) according to claim 1.

25. Dyed paper obtained by the method according to claim 24.

26. A solid dye preparation for the dyeing of paper, which comprises at least one dye according to claim 1 and a solid diluent.

27. A liquid dye preparation for the dyeing of paper, which comprises at least one dye according to claim 1 and water.

28. A dye mixture comprising a dye of the formula (1), (2) or (3) according to claim 1 and a cationic copper phthalocyanine dye.

29. A dye mixture according to claim 28, wherein the copper phthalocyanine dye used is a dye of the formula

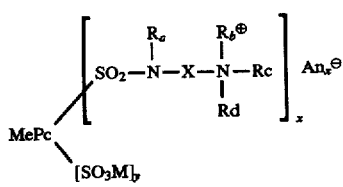

wherein

MePc is a copper, cobalt or nickel phthalocyanine radical, $R_a$ is hydrogen or alkyl, X is alkylene, and $R_b$, $R_c$ and $R_d$, are each independently alkyl which is unsubstituted or substituted by hydroxy, alkoxy, phenyl or amino, or $R_a$ and $R_b$ when taken together are methylene, ethylene or propylene if X is methylene or ethylene, or two or three of $R_b$, $R_c$ and $R_d$, together with the nitrogen atom, form a 5- to 7-membered unsubstituted or substituted heterocyclic ring which is uninterrupted or interrupted by one or two additional hetero atoms selected from the group consisting of O, N and S as ring members, $An^\ominus$ is an anion and M is a cation, and x is greater than y and y is greater than 0, and the sum of x+y is 4 or less than 4, or of the formula

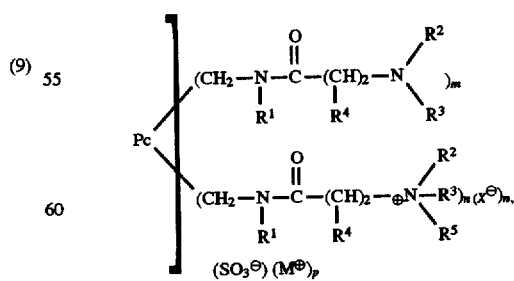

where Pc is an (m+n+p)-valent phthalocyanine radical, $R^1$ is H or alkyl, $R^2$ and $R^3$ independently of one another are alkyl, hydroxyalkyl, cycloalkyl, benzyl, phenyl or tolyl, or

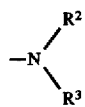

is pyrrolidinyl, imidazolyl, 2-ethyl-4-methylimidazolyl, morpholinyl, piperazinyl or N'-alkylpiperazinyl, or is

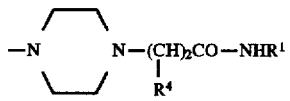

$R^4$ is H or methyl, $R^5$ is alkyl, hydroxyalkyl or benzyl, $X^{\ominus}$ is one equivalent of an anion, $M^{\oplus}$ is one equivalent of a cation, z is 1 or 2, p is 0 or 1 m is 0 to 1 and n is from 1 to 4, and $1 \leqq (m+n) \leqq 4$.

30. A dye according to claim 2, wherein Z is an unsubstituted $C_3$–$C_6$alkylene or unsubstituted 1,4-phenylene.

31. A dye according to claim 1, which is of the formula (2) in which $Z_1$ is unsubstituted 1,4-phenylene.

* * * * *

UNITED STATES PATENT AND TRADEMARK OFFICE
CERTIFICATE OF CORRECTION

PATENT NO. : 5,708,151
DATED : January 13, 1998
INVENTOR(S) : Mockli

It is certified that error appears in the above-indentified patent and that said Letters Patent is hereby corrected as shown below:

Column 31, line 27 please delete "and" and substitute with: -- or --.

Column 32, line 20, please insert -- n = 2, 3 or 4 --.

Column 33, line 5, please delete "radicals of the formula (4) in which $R_5$ and $R_6$ am methoxy," and substitute with: -- radicals of the formula (4) in which $R_5$ and $R_6$ are methoxy, --.

Columns 34 and 35, lines 54, 3 and 40, please delete formula (8) and replace with:

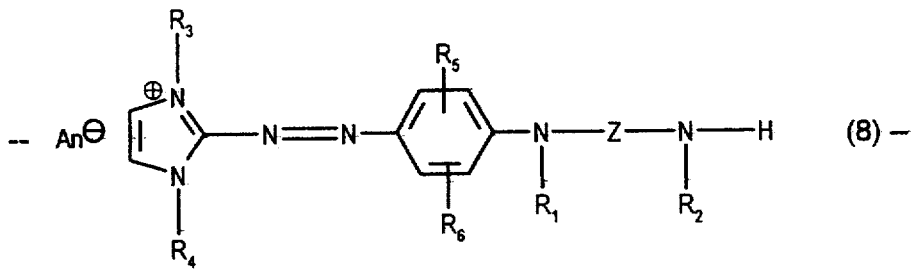

Column 36, line 5, please delete "the paper with with an effective amount of a dye of the" and substitute with -- the paper with an effective amount of a dye of the --.

Signed and Sealed this

Thirtieth Day of June, 1998

Attest:

BRUCE LEHMAN

Attesting Officer    Commissioner of Patents and Trademarks